United States Patent
Wada et al.

(10) Patent No.: US 6,186,509 B1
(45) Date of Patent: Feb. 13, 2001

(54) ROTARY JOINT ASSEMBLY

(75) Inventors: Masato Wada; Junji Omiya, both of Osaka (JP)

(73) Assignee: Nippon Pillar Packing Co., Ltd., Osaka (JP)

( * ) Notice: Under 35 U.S.C. 154(b), the term of this patent shall be extended for 0 days.

(21) Appl. No.: 09/316,067

(22) Filed: May 21, 1999

(30) Foreign Application Priority Data

May 22, 1998 (JP) .................................................. 10-140933

(51) Int. Cl.$^7$ ..................................................... F16L 39/04

(52) U.S. Cl. ........................... 277/363; 277/590; 277/603

(58) Field of Search .............................. 285/121.4, 121.5, 285/121.3, 306, 326, 348, 358, 590, 603; 277/363, 362

(56) References Cited

U.S. PATENT DOCUMENTS 5,199,748    4/1993   Jung et al. .

FOREIGN PATENT DOCUMENTS 41 03 376    8/1992    (DE) .
1-269727    10/1989    (JP) .

Primary Examiner—Terry Lee Melius
Assistant Examiner—Frederick Conley
(74) Attorney, Agent, or Firm—Jacobson, Price, Holman & Stern, PLLC

(57) ABSTRACT

A space between a housing and a rotator is hermetically sealed with a double-mechanical seal. A pair of rotary seal rings are sandwiched between a pair of stationary seal rings while sandwiching therebetween a stopper ring for inhibition of relative rotation between the rotary seal rings and the rotator. A spring is interposed in a space between the stopper and each of the rotary seal rings for pressing each rotary seal ring against the corresponding stationary seal ring.

2 Claims, 5 Drawing Sheets

ROTARY JOINT ASSEMBLY

FIELD OF THE INVENTION

The present invention relates generally to a rotary joint assembly for use in a fluid pipeline.

DESCRIPTION OF THE PRIOR ART

A rotary joint assembly for fluid pipeline is mounted to, for example, a polishing apparatus which uses the CMP (Chemical Mechanical Polishing) method for polishing a silicon wafer surface. The surface polishing apparatus polishes the surface of a silicon wafer 102 in the following manner. A polishing pad 103 is brought into contact with the surface of the wafer 102 placed on a rotating table 101, as shown in FIG. 3. The polishing pad 103 is rotated and horizontally moved back and forth while a pump 104 delivers a jet of polishing fluid, such as of a fluid slurry, between the wafer surface and the polishing pad whereby the wafer is polished.

In the surface polishing apparatus of this type, a rotating shaft 105 of the rotating table 101 includes a fluid feed passage 106 for feeding a cleaning or temperature regulating liquid and compressed air for drying, to the wafer 102 and the rotating table 101 after completion of the polishing work, and a fluid recovery passage 107 for recovering the cleaning or temperature reguration liquid supplied to the silicon wafer 102 and the rotating table 101. The fluid feed passage 106 is connected to a fluid feeding pump P10 via a rotary joint assembly 108. On the other hand, the fluid recovery passage 107 is connected to a fluid recovering pump P20 via the rotary joint assembly 108.

As shown in FIG. 4, the rotary joint assembly 108 has a construction in which a rotator 110 is rotatably retained in a hollow interior of the housing 109. The housing 109 includes a first flow opening 109a communicated with the fluid feeding pump P10, and a second flow opening 109b communicated with the fluid recovering pump P20. Extended through the rotator 110 are a first flow passage 111 for communication between the first flow opening 109a in the housing 109 and the fluid feed passage 106 in the rotating shaft 105 (FIG. 3), and a second flow passage 112 for communication between the second flow opening 109b in the housing 109 and the fluid recovery passage 107 in the rotating shaft 105. An annular space to be formed between the housing 109 and the rotator 110 is hermetically defined with O-rings 113.

Unfortunately, the above rotary joint assembly 108 suffers a lowered durability because the O-rings 113, in sliding contact with the rotator 110, are prone to wear. Further, the use of high-pressure fluid is not permitted because the O-ring-sealed gap falls short of ensuring the air-tightness.

As a solution to this problem, there is proposed a rotary joint assembly employing a double-mechanical seal for sealing the gap between the housing 109 and the rotator 109. As shown in FIG. 5, this rotary joint assembly has a first rotary seal ring 121 axially movably mounted to a lower end portion of the rotator 110. Opposite to the first rotary seal ring 121, a first stationary seal ring 122 is secured to the housing 109. A first helical spring 123 presses the first rotary seal ring 121 into intimate contact with the first stationary seal ring 122. The rotary joint assembly further has a second rotary seal ring 124 secured to place near an upper end of the rotator 110. Opposite to the second rotary seal ring 124, a second stationary seal ring 125 is axially movably mounted to the housing 109. A second helical spring 126 biases the second stationary seal ring 125 into intimate contact with the second rotary seal ring 124.

However, the above rotary joint assembly has the construction in which the first helical spring 123 is disposed at the lower end of the first seal ring 121, and the second helical spring 126 is interposed between the first and second stationary seal rings 122, 125, and hence, the housing 109 and the rotator 110 must have great axial lengths. As a result, the assembly is great in size.

OBJECT AND SUMMARY OF THE INVENTION

In view of the foregoing, an object of the present invention is to provide a rotary joint assembly which ensures the air-tightness and durability and accomplishes the downsizing of the assembly.

For achieving the above object, the rotary joint assembly according to the present invention comprises:

a hollow housing including a flow opening;

a rotator including a flow passage communicated with the flow opening and being rotatably retained in a hollow interior of the housing; and a double-mechanical seal for hermetically defining a space to be formed between the housing and the rotator, the double-mechanical seal including:

a pair of rotary seal rings axially movably mounted to the rotator as spaced from each other by a predetermined distance;

a pair of stationary seal rings retained by the housing as sandwiching the rotary seal rings therebetween;

a stopper ring interposed between the pair of rotary seal rings as spaced from the respective rotary seal rings, the stopper ring inhibiting relative rotation between the rotary seal rings and the rotator and including a through-hole for communication between the flow opening and the flow passage; and a spring interposed in a space between the stopper ring and each of the rotary seal rings and biasing each of the rotary seal rings into intimate contact with the corresponding stationary seal ring.

According to the rotary joint assembly of the above construction, the stopper ring is interposed between the pair of rotary seal rings. Interposed in the space between the stopper ring and each rotary seal ring is the spring for biasing each rotary seal ring. Thus, the whole length of the double-mechanical seal is reduced. Accordingly, the housing and the rotator have reduced axial lengths, which, in turn, provide the corresponding downsizing of the assembly. In addition, the hermetically sealed structure using the mechanical seal ensures high air-tightness and durability of the assembly.

In the above rotary joint assembly, the aforesaid spring is preferably a laminated spring. The use of such a spring ensures a desired elastic-biasing force and also accomplishes the reduction of the axial length of the spring. Thus, the housing and the rotator are even further reduced in the axial lengths thereof.

DESCRIPTION OF THE PREFERRED EMBODIMENT

Hereafter, a preferred embodiment of the present invention will be described with reference to the accompanying drawings.

Figure 2:
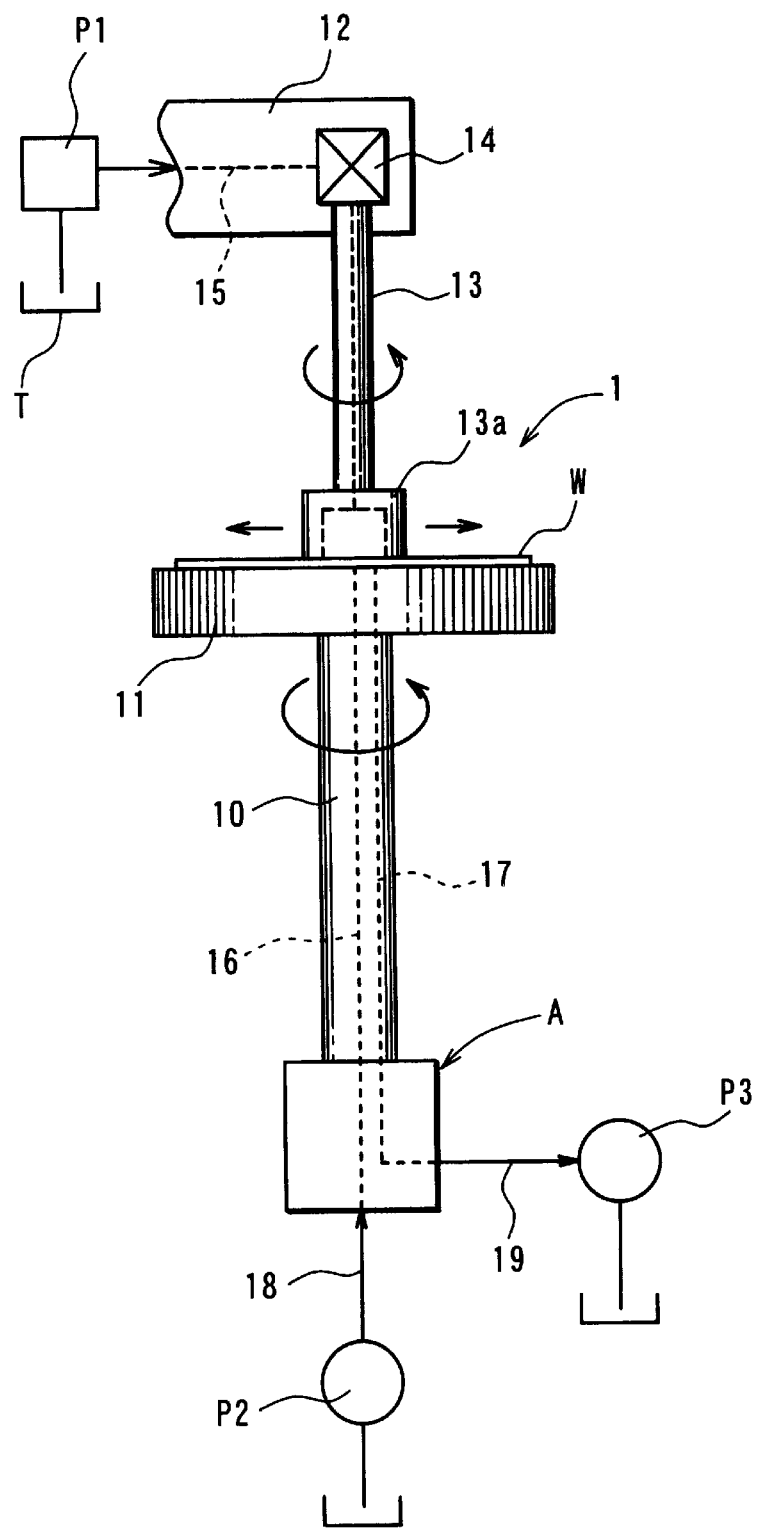
FIG. 2 is a schematic diagram showing a silicon-wafer-surface polishing apparatus employing the above rotary joint assembly.
Figure 3:
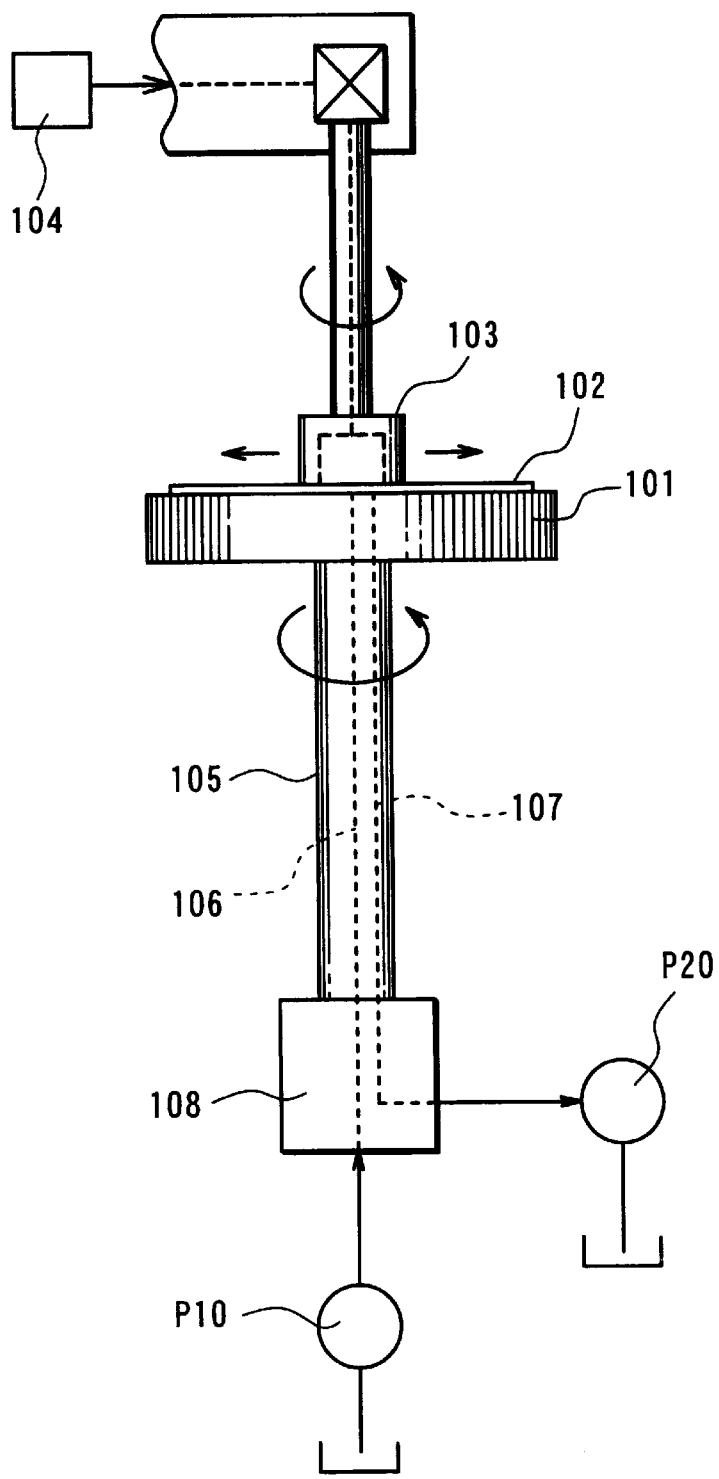
FIG. 3 is a schematic diagram showing a silicon-wafer-surface polishing apparatus employing the prior-art rotary joint assembly.
Figure 4:
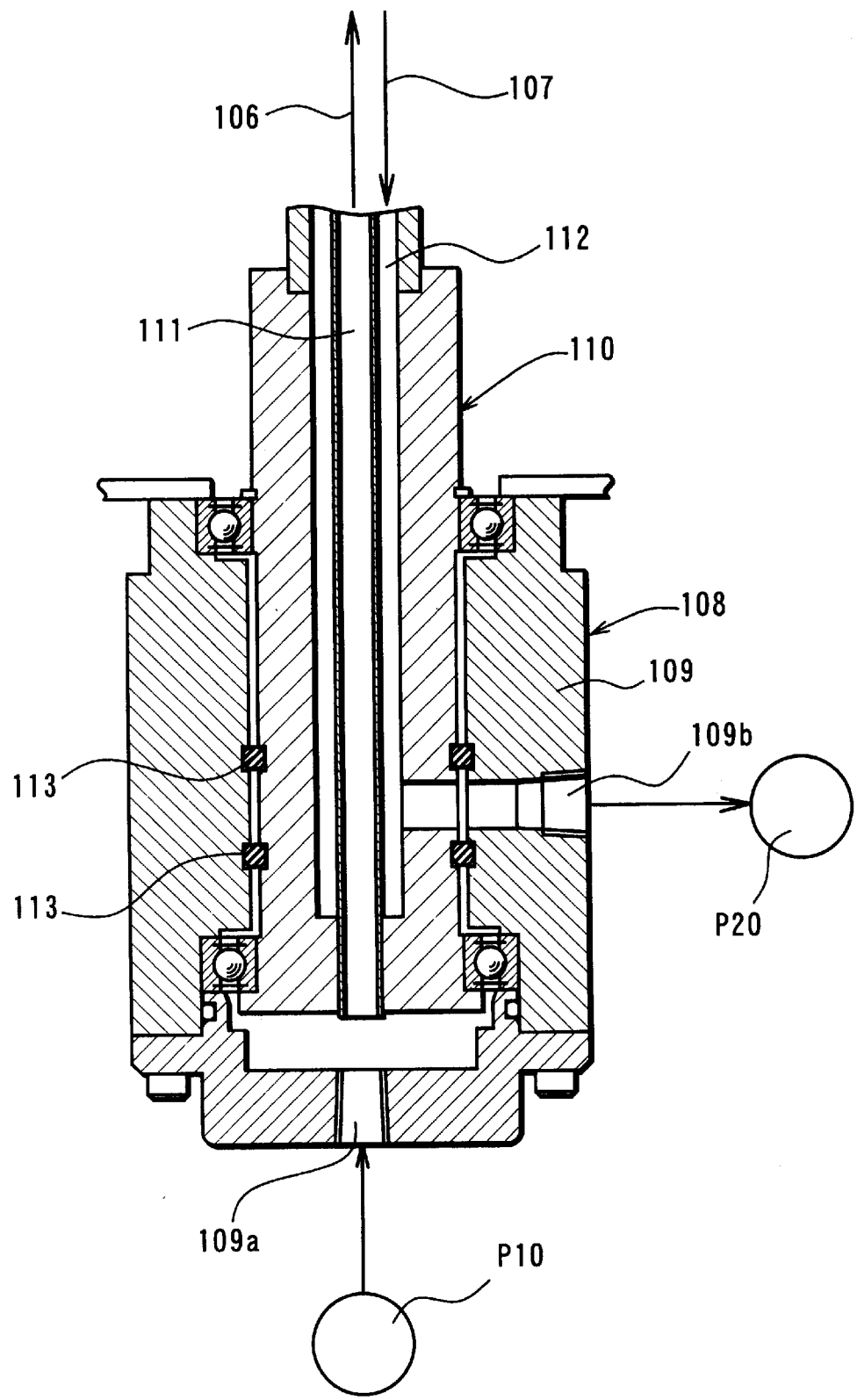
FIG. 4 is a sectional view showing an exemplary rotary joint assembly of the prior art.
Figure 5:
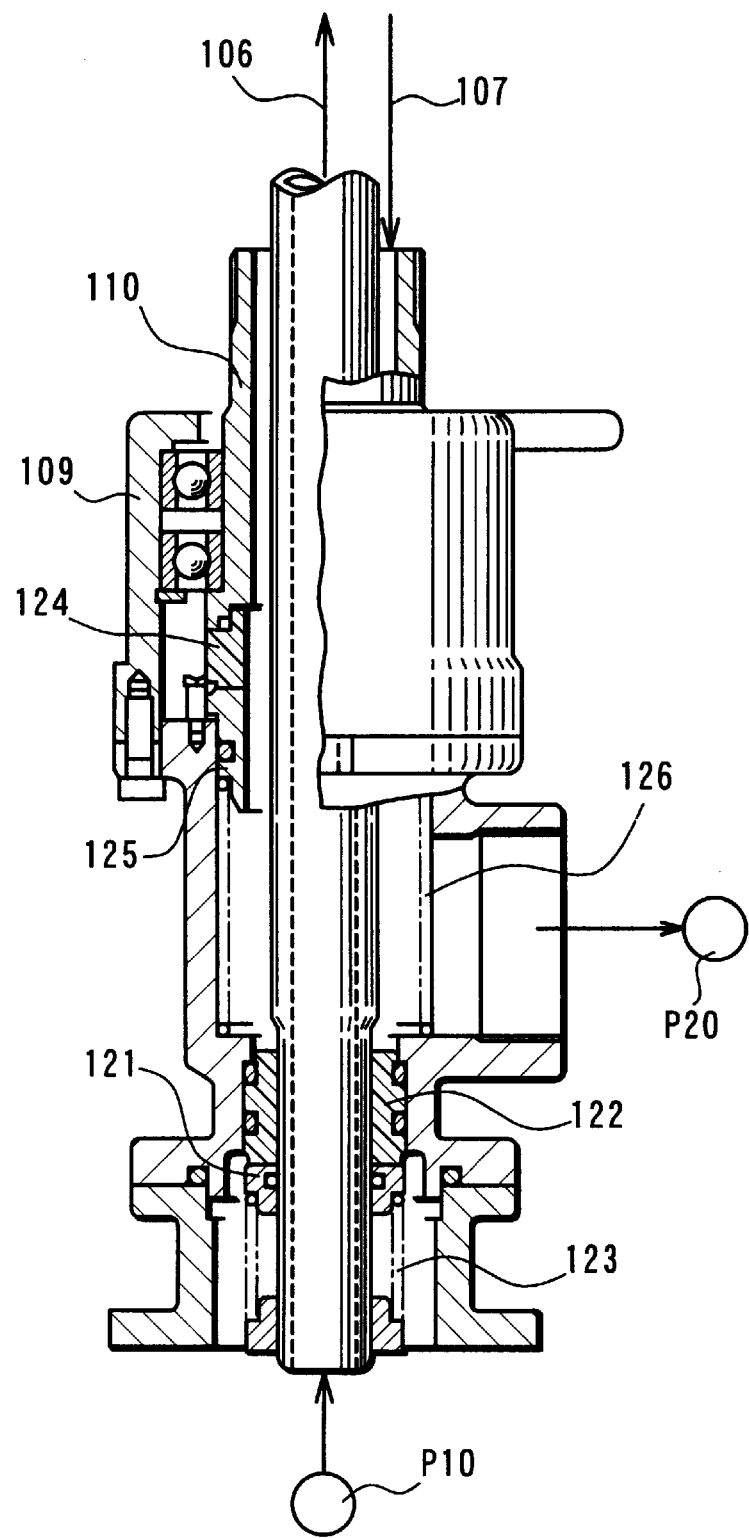
FIG. 5 is a sectional view showing another exemplary rotary joint assembly of the prior art.

FIG. 2 schematically illustrates a polishing apparatus 1 for polishing a surface of a silicon wafer based on the CMP method, the apparatus employing a rotary joint assembly according to the present invention.

The surface polishing apparatus 1 essentially includes a rotating shaft 10 rotated about a vertical axis, a rotating table 11 adapted to rotate integrally with the rotating shaft 10, a vertically movable pad support 12 which is moved back and forth horizontally, and a polishing pad 13 rotated as supported by the pad support 12.

A fluid-slurry feed/discharge path 15 extends through the pad support 12 and the polishing pad 13 and opens into a bottom surface of a pad portion 13a. A rotary joint 14 rotatably interconnects a stationary side (a portion for the pad support 12) of the fluid-slurry feed/discharge path 15 and a rotary side (a portion for the polishing pad 13) thereof. Connected to one end of the fluid-slurry feed/discharge path 15 is a pump P1 serving to feed a polishing fluid as a fluid slurry stored in a tank T to a silicon wafer W or to recover polishing fluid remaining in the fluid-slurry feed/discharge path 15 to the tank T.

The rotating shaft 10 includes a rotary-side fluid feed passage 16 for feeding a cleaning or temperature regulating liquid (hereafter is simply referred to as the cleaning liquid), such as pure water, hot water and the like, and compressed air for drying to the silicon wafer W and the rotating table 11 after completion of the polishing work, and arotary-side fluid recovery passage 17 for recovering the cleaning liquid and the like fed to the silicon wafer W and the rotating table 11. The rotary-side fluid feed passage 16 is connected to a fluid feeding pump P2 via a rotary joint assembly A of the present invention disposed at a lower end of the rotating shaft 10 and via a stationary-side fluid feed passage 18. On the other hand, the rotary-side fluid recovery passage 17 is connected to a fluid recovering pump P3 via the rotary joint assembly "A" and a stationary-side fluid recovery passage 19.

Figure 1:
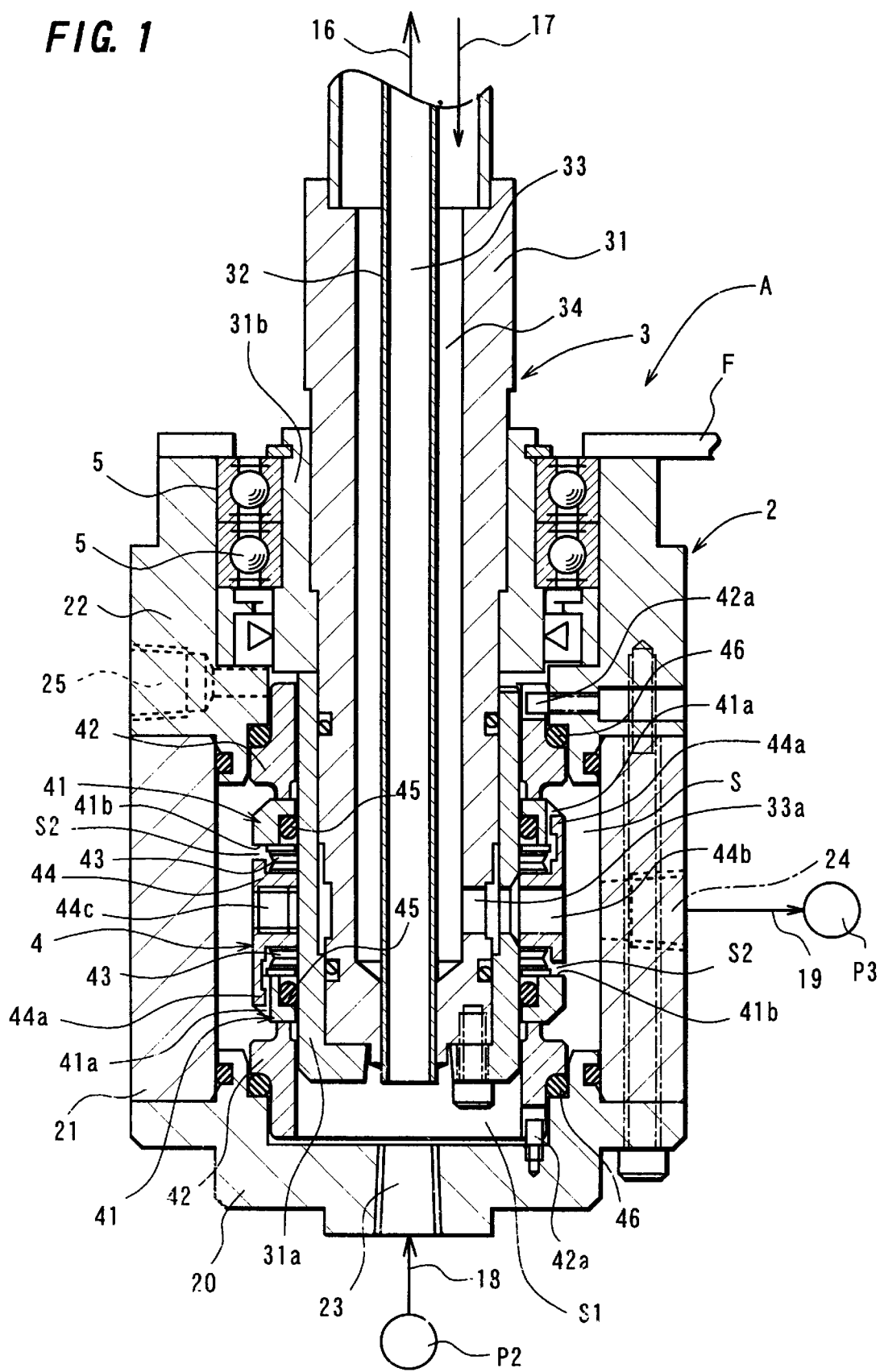
FIG. 1 is a sectional view showing a rotary joint assembly according to one embodiment of the present invention.

Also referring to FIG. 1, the rotary joint assembly "A" essentially includes a housing 2 mounted to a frame F, a rotator 3 rotatably retained in a hollow interior of the housing 2, and a double-mechanical seal 4 for hermetically defining a space to be formed between the housing 2 and the rotator 3.

The housing 2 is formed of a bottomed cylinder defined by a bottom plate 20, and a first and second annular members 21, 22 which are vertically coupled to end. The bottom plate 20 is formed with a first flow opening 23, which extends through a central portion of the bottom plate 20, for permitting the fluid to be fed through the stationary-side fluid feed passage 18 into the housing 2. The first annular member 21 is formed with a second flow opening 24, which radially extends through the annular member 21, for leading the fluid from the interior of the housing 2 to the stationary-side fluid recovery passage 19.

The rotator 3 is of a double-walled hollow structure in which a second cylindrical body 32 extends through a first cylindrical body 31 with a predetermined gap defined therebetween. The first cylindrical body 31 has sleeves 31a and 31b fitted over its outer surface. The rotator 3 is rotatably retained by the housing 2 via a pair of bearings 5 fitted over the sleeves 31b. An upper end portion of the rotator 3 projects from the housing 2. A top end of the projected portion of the rotator 3 is connected to the rotating shaft 10 in a manner to integrally rotate with the shaft 10. An annular closed space S is defined between an outer circumference of a lower portion of the first cylindrical body 31 and an inside circumference of the housing 2. The second flow opening 24 fronts on this closed space S.

A lower end of the second cylindrical body 32 opens at a lower end of the first cylindrical body 31. An interior of the second cylindrical body 32 defines a first flow passage 33 for communication between the stationary-side fluid feed passage 18 and the rotary-side fluid feed passage 16. A through-hole 33a radially extends through a peripheral wall of the lower portion of the first cylindrical body 31 to intercommunicate the interior of the first cylindrical body 31 and the closed space S. A gap between an inside circumference of the first cylindrical body 31 and an outer circumference of the second cylindrical body 32 cooperates with the closed space S and the second flow opening 24 to thereby define a second flow passage 34 for communication between the rotary-side fluid recovery passage 17 and the stationary-side fluid recovery passage 19.

A circular space S1 is formed between a lower end portion of the rotator 3 and the bottom plate 20. The first flow passage 33 and the first flow opening 23 are communicated with each other via the circular space S1.

The double-mechanical seal 4 includes a pair of rotary seal rings 41 formed of silicon carbide, a pair of stationary seal rings 42 formed of silicon carbide and disposed in sliding contact with the rotary seal rings 41, a pair of springs 43 for biasing the rotary seal rings 41 away from each other, and a stopper ring 44 interposed between the pair of springs 43.

The rotary seal rings 41 are axially movably fitted about the rotator 3 at places axially spaced from each other by a predetermined distance. In addition, the rotary seal rings 41 are disposed in axially opposite relation to each other. Specifically, the lower rotary seal ring 41 has its sliding-contact surface directed toward the lower end of the rotator 3, whereas the upper rotary seal ring 41 has its sliding-contact surface directed toward the upper end of the rotator 3. Gaps between the rotary seal rings 41 and the rotator 3 are each sealed with a first O-ring 45.

The stationary seal rings 42 are fixed to the inside circumference of the housing 2, as sandwiching the rotary seal rings 41 therebetween. The stationary seal rings 42 are disposed in face-to-face relation with the sliding-contact surfaces thereof opposing each other. The stationary seal rings 42 are each locked to the housing 2 via a whirl-stopper pin 42a, thus being inhibited from rotation. Gaps between the stationary seal rings 42 and the inside circumference of the housing 2 are each sealed with a second O-ring 46. The lower-side stationary seal ring 42 is disposed around the sleeve 31a with a minute gap therebetween, thereby rotatably supporting the rotator 3 and preventing eccentricity of the rotator 3. Accordingly, a bearing is not necessary, which contributes to downsizing of the rotary joint assembly "A".

Each of the springs 43 consists of a laminated spring including multiple annular members like Belleville springs connected in axially opposite relation to each other. The springs 43 serve to bias the rotary seal rings 41 away from each other, thereby bringing the respective rotary seal rings into intimate contact with the corresponding stationary seal rings 42. The use of the laminated springs as the springs 43 not only ensures a desired spring-biasing force but also accomplishes the reduction of the axial length of the springs 43.

The stopper ring 44 is fitted about the outer surface of the rotator 3 while inhibited from relative rotation with respect to the rotator 3 by a set screw 44c. Opposite side surface portions on the outside circumference of the stopper ring 44 are formed with engagement projections 44a which axially extend in opposite directions to each other and have angular phases thereof shifted 180° from each other. The engagement projections 44a are engaged with engagement grooves 41a formed in the peripheries of the rotary seal rings 41, respectively, thereby inhibiting relative rotation between the rotator 3 and the rotary seal rings 41. The stopper ring 44 includes a through-hole 44b which extends radially therethrough to be continuous to the through-hole 33a formed in the peripheral wall of the rotator 3.

Further, a backside space S2 of the rotary seal ring 41 is formed between each of the rotary seal rings 41 and the stopper ring 44. This backside space S2 is communicated with the closed space S. This communication between the backside space S2 and the closed space S has the following significance.

That is, the rotary joint assembly "A" is used under a wet-sliding condition that the fluid slurry is hermetically introduced. But, when a dry air is introduced instead of the fluid slurry, the rotary joint assembly "A" is used under a dry-sliding condition. In such a dry-sliding condition, sliding contact surfaces of the both seal rings 41 and 42 are liable to wear. Accordingly, it is desirable that a pushing force of the rotary seal ring 41 against the stationary seal ring 42 is as weak as possible. To the contrary, it is important under the wet-sliding condition that the rotary seal rings 41 are strongly pressed to the stationary seal ring 42 to thereby enhance a sealing performance. Otherwise, the slurry fluid may leak through the sliding-contact surfaces. In the aforementioned construction of the embodiment, when the closed space S is filled with the liquid, a liquid pressure acts on each of the rotary seal rings 41. Here, a back face 41b of the rotary seal ring 41 has a pressure receiving area larger than that of a front face thereof, thereby generating a force for pushing the rotary seal ring 41 toward the stationary seal ring 42. Therefore, this force cooperates with the spring 43 to strongly push the rotary seal rings 41 to the corresponding stationary seal ring 42. Thus, sealing performance for the fluid slurry is enhanced. In consideration for this action, a spring force of the spring 43 may be weak. On the other hand, in the dry-sliding condition, only the spring 43 pushes the rotary seal rings 41 to the respective static seal ring 42, thereby restraining abrasion of the both seal rings 41 and 42.

The second annular member 22 of the housing 2 includes a cooling-liquid feed port 25, which extends radially through the member 22, for introduction of the liquid for cooling the sliding-contact surfaces of the rotary seal ring 41 and the stationary seal ring 42. Accordingly, the sliding-contact surfaces are always cooled by the liquid supplied from the cooling-liquid feed port 25 even when the condition is changed from the wet-sliding to the dry-sliding.

Also, the second flow opening 24 is located above the lower-side sliding-contact surface, and the cleaning liquid is pooled in the housing 2 up to a level of the second flow opening 24. As a result, the lower-side sliding-contact surface is soaked in and cooled by the cleaning liquid pooled in the housing 2, and also a liquid film is formed between the seal rings 41 and 42. The cleaning liquid remains in the housing 2 even in the dry-sliding condition. Thus, seizure or abnormal abrasion of the seal rings 41 and 42 is prevented. According to the above-mentioned construction, a cooling device for cooling the lower-side sliding-contact surface is not necessary, thereby contributing to downsizing of the rotary joint assembly "A".

The lower-side rotary seal ring 41 and the stationary seal ring 42 serve to not only seal the closed space S but also define the closed circular space S1. As a result, the circular space S1 serves as a joint box for communication between the first flow passage 33 as a rotatable part and the first flow opening 23 as a stationary part. It is therefore unnecessary to provide a sealing device (e.g., a mechanical seal) between the first flow passage 33 and the first flow opening 23. This also contributes to downsizing of the rotary joint assembly "A".

The above double-mechanical seal 4 has a construction such that the stopper ring 44 is interposed between the pair of rotary seal rings 41 with the springs 43 interposed in the respective spaces between the stopper ring 44 and the respective rotary seal rings 41 and therefore, the whole axial length of the double-mechanical seal 4 can be reduced. This leads to the reduction of the axial lengths of the housing 2 and of the rotator 3, which accordingly results in the downsizing of the rotary joint assembly "A". In addition, the assembly is of a hermetically sealed structure using the double-mechanical seal 4, which offers higher air-tightness and durability than a hermetically sealed structure using the O-rings. The laminated spring used as the spring 43 results in the reduced axial length of the spring 43. This leads to the further reduction of the axial lengths of the housing 2 and the rotator 3. Thus, the rotary joint assembly "A" is more effectively downsized.

It should be appreciated that the rotary joint assembly of the present invention is not limited to the above embodiment and various modifications may be made to the design thereof. For example, the helical spring may be used as the spring 43.

Further, the rotary joint assembly of the present invention is applicable not only to the above surface polishing apparatus for silicon wafer but also to various machines, such as robots, automatic coating machines, automatic machine tools, automatic assemblers and the like, which require the fluid to be fed to the rotating parts. In this case, the rotator 3 may have therein only one flow passage.

What is claimed is:

1. A rotary joint assembly comprising:

a hollow housing including a flow opening;

a rotator including a flow passage communicated with said flow opening and being rotatably retained in a hollow interior of said housing; and a double-mechanical seal for hermetically defining a space to be formed between said housing and said rotator, said double-mechanical seal including:

a pair of rotary seal rings axially movably mounted to said rotator as spaced from each other by a predetermined distance;

a pair of stationary seal rings retained by said housing as sandwiching said rotary seal rings therebetween;

a stopper ring interposed between said pair of rotary seal rings as spaced from the rotary seal rings, said stopper ring inhibiting relative rotation between said rotary seal rings and said rotator and including a through-hole for communication between said flow opening and said flow passage; and a spring interposed in a space between said stopper ring and each of said rotary seal rings and biasing each of said rotary seal rings into intimate contact with the stationary seal ring.

2. A rotary joint assembly as claimed in claim 1, wherein said spring comprises a laminated spring.

* * * * *